United States Patent
Merte et al.

(10) Patent No.: US 10,705,003 B2
(45) Date of Patent: Jul. 7, 2020

(54) PARTICLE MEASURING DEVICE IN A GAS FLOW PATH

(71) Applicant: Testo SE & Co. KGaA, Lenzkirch (DE)

(72) Inventors: Rolf Merte, Freiburg (DE); Ralf Stich, Buchenbach (DE)

(73) Assignee: Testo SE & Co. KGaA, Lenzkirch (DE)

( * ) Notice: Subject to any disclaimer, the term of this patent is extended or adjusted under 35 U.S.C. 154(b) by 77 days.

(21) Appl. No.: 16/063,902

(22) PCT Filed: Nov. 28, 2016

(86) PCT No.: PCT/EP2016/002006
§ 371 (c)(1),
(2) Date: Jun. 19, 2018

(87) PCT Pub. No.: WO2017/108151
PCT Pub. Date: Jun. 29, 2017

(65) Prior Publication Data
US 2018/0372610 A1    Dec. 27, 2018

(30) Foreign Application Priority Data

Dec. 22, 2015   (DE) .................. 10 2015 016 820

(51) Int. Cl.
*G01N 15/06* (2006.01)
*G01N 27/70* (2006.01)
*G01N 15/00* (2006.01)

(52) U.S. Cl.
CPC ..... *G01N 15/0656* (2013.01); *G01N 15/0618* (2013.01); *G01N 27/70* (2013.01);
(Continued)

(58) Field of Classification Search
CPC ........... G01N 15/0656; G01N 15/0618; G01N 27/62; G01N 27/70; G01N 2015/0693; G01N 2015/0046
(Continued)

(56) References Cited

U.S. PATENT DOCUMENTS

| 2008/0041138 A1* | 2/2008 | Marra ................. B60H 1/008 73/31.02 |
| 2008/0191132 A1* | 8/2008 | Boyle ................. G01N 27/624 250/287 |
| 2012/0067716 A1 | 3/2012 | Buske |

FOREIGN PATENT DOCUMENTS

| DE | 102009006016 | 7/2010 |
| EP | 2320219 | 5/2011 |

* cited by examiner

*Primary Examiner* — Benjamin R Schmitt
(74) *Attorney, Agent, or Firm* — Volpe and Koenig, P.C.

(57) ABSTRACT

A measuring assembly for detecting particles of a particle flow in a gas flow path, including an ionization stage which has an ionization device by which the particles to be detected can be ionized or are ionized. The measuring assembly further has measuring stage with a detector which detects the ionized particles of the particle flow, the detector has at least one electrode to which particles release the charge received at the ionization device. The released charge can be measured via an electric resistor connected to the at least one electrode. This provides an inexpensive and reliable measuring assembly which has a low susceptibility to errors in that the at least one electrode of the detector is designed as a microsystem. In order to improve the measurement of the charge carried by the ionized gas, the pores of a filter substrate are metallized and electrically connected to the resistor.

17 Claims, 3 Drawing Sheets

(52) U.S. Cl.
CPC ............... *G01N 2015/0046* (2013.01); *G01N 2015/0693* (2013.01)

(58) Field of Classification Search
USPC .............. 73/23.2, 28.01, 28.02, 31.05, 31.06
See application file for complete search history.

PARTICLE MEASURING DEVICE IN A GAS FLOW PATH

BACKGROUND

The invention relates to a measuring assembly for detecting particles of a particle stream in a gas flow path, comprising an ionization stage which has an ionization device, by which the particles to be detected can be or are ionized and with a measuring stage with a detector which detects the ionized particles of the particle stream, said detector having at least one electrode to which particles release the charge picked up on the ionization device, where the charge released can be measured via an electric resistor connected to the at least one electrode.

Measuring assemblies for detecting particles in a particle stream are widely known and used for the detection of size and/or number of particles. Known here, for example, are assemblies for carrying out gravimetric or optical particle measuring methods, but also those of the type mentioned at the beginning, in which, in a gas flow path, an ionization region or an ionization stage having an ionization device, and a measuring stage connected downstream of this stage and having a detector are arranged and formed. The detector has an electronic counting device. Here, the particle stream can, for example, be an exhaust gas flow, for example from an internal combustion engine.

The detector in known particle measuring assemblies can be formed, for example, as an electrode which is connected to the electronic counting device, while an ionization wire, for example a tungsten wire, to which high voltage is applied is arranged in the ionization region as ionization device, or a UV radiation source acts in an ionizing manner on the particle stream. The at least one electrode can be formed in the shape of a grid, to which a high-value resistor is connected. For the purpose of particle counting, the charge picked up by the particles in the ionization stage and released to the electrode is measured as a current flow over the high-value resistor.

SUMMARY

In order to provide such particle measuring assemblies with a wider range of use and to make a beneficial and less fault-susceptible, reliable measuring assembly available, the invention is based on the object of miniaturizing the known measuring assemblies.

This object is achieved by a particle measuring assembly having one or more features of the invention. Such particle measuring assemblies therefore in particular provide for the at least one electrode to be formed as a microsystem. This has the advantage that the measuring stage can be implemented in miniaturized form, possibly at the same time with an evaluation stage. By the implementation as a microsystem, also called MEMS (acronym for micro-electro-mechanical system), the measuring assemblies can be designed with a higher level of integration and mechanical and electrical functions present can be combined, so that a multi-functional system is produced. Here, use is made of the fact that electric components with their circuits can be arranged on a carrier substrate or sometimes also base material of a semiconductor material with a high functional density, also simply called a substrate. The aforementioned higher level of integration is normally accompanied by reduced costs because of lower material use and higher fabrication density; in addition in interacting systems the reliability and speed of reaction can be improved on account of short paths with few interfaces.

In a preferred development, a measuring assembly according to the invention can be formed with a plurality of electrodes, for example with two or three electrodes. Given an appropriate geometric arrangement, in this way, if appropriate, a discrimination criterion for different particles releasing their charge to the electrodes, for example with respect to their size, can be established.

An advantageous embodiment of the measuring assembly according to the invention, which advances the miniaturization and therefore the level of integration further, provides for the high-value resistor likewise to be formed as a microsystem. This high-value resistor is used to measure the low currents that occur during the release of charge carriers on the electrode. This has the advantage that the resistance value of the high-value resistor, which can lie in the tera-ohm range, can be fabricated with lower fabrication tolerance scatter. At the same time, it may be advantageous, in addition to the aforementioned resistor, also to use an operational amplifier to amplify the low currents and to form the same as a microsystem, so that the individual particles releasing charge can be detected reliably.

In an advantageous embodiment of the measuring assembly, the electrode can be provided as an electrically conductive, in particular metallic, coating of a wall-like structure at least partly provided with the coating, wherein in particular the wall-like structure can be formed, for example, by a porous filter substrate, which is arranged in the gas flow path and through which the gas flow can flow or flows. In this way, the electrode itself can form an integral part of the volume for the particle stream to pass through.

In a preferred development, the pores of the filter substrate through which the particle stream has to pass in every case can be metalized and, in this way, form the electrode and here be connected electrically to the resistor.

In the embodiment as a porous filter substrate, different pore sizes can advantageously be formed on the filter substrate, so that, in a development of the measuring assembly according to the invention, the detector of the measuring stage is formed with at least one filter substrate having pores of one pore size or a multiplicity of filter substrates having different pore sizes.

In a particularly preferred embodiment of the measuring assembly, the detector has at least two electrodes arranged in the gas flow path with pores of different pore size, which are assigned to the different filter substrates. Here, the substrates forming the electrodes with their metalized pores are arranged beside one another or preferably one after another in the flow path. In particular in the case of two electrodes arranged one after another, the electrode with the larger-dimensioned pore size is located upstream of the other electrode.

In a preferred embodiment of the measuring assembly, the detector is formed in a measuring chamber. It is advantageous here that the detector can be arranged to be shielded with respect to the outside. It is particularly beneficial here if the measuring chamber is formed as a microsystem, in particular by structuring at least one substrate. It is advantageous that the measuring stage can be formed completely or virtually completely as a microsystem.

This has the advantage that the two electrodes respond differently to different sizes of particles.

For example, it is already known from filters that large-mesh filters tend to be insensitive to large particles, while small particles release their charge there due to the Brownian movement, while smaller-mesh filters likewise detect the aforementioned large particles. The particles should therefore pass firstly through a coarser-mesh substrate filtering smaller particles, for which reason this is arranged upstream in the case of a different pore size.

By connecting an electrode with large pore size and a following electrode with small pore size one after another, it is thus possible for different electrical signals to be present, which permit conclusions to be drawn about the size distribution of the particles.

A measuring assembly having a particularly simple structure can expediently provide for a plurality of electrodes, in particular two electrodes, with their respective filter substrate to be arranged adjacently one after another or beside one another in the gas flow path and here, brought into contact with one another, possibly spaced apart.

It is thus possible for an electrically insulating hollow space to be formed between the electrodes, through which the gas can flow. Here, the filter substrates spaced apart from one another each form a type of filter stage, which are insulated from one another in a suitable way, which means in turn that the emergence of leakage currents is reduced. As a result of the insulation, it is possible to achieve the situation where the electrodes are not short-circuited. Thus, separate current measurement is made possible. Here, it is advantageous, in particular in relation to a detection limit, if the leakage currents are low.

Using the porous substrates, periodic structures for the passage of the particles are created, which can be formed by structured semiconductors in the manner of photonic crystals or etched channels, which can each form passages of desired shape and size. Electrodes can be arranged on the passages by suitable coating methods, such as CVD (chemical vapor deposition) or PVD, physical vapor deposition, chemical vapor deposition.

Another advantageous embodiment of the measuring assembly assigns each of the one or more electrodes of the detector an evaluation electronic unit, which is arranged jointly with the electrode on a carrier substrate provided with the latter. The carrier substrate can both "only" carry the electrode(s) and also comprise the same. The resistor or resistors used for the evaluation can, for example, be implanted in the substrate and thus integrated, which leads to a lower scattering of values as a result of the protection formed hereby. At the same time, in each case an operational amplifier can also be integrated, the amplification and noise behavior of which are improved hereby, while offset voltages and leakage currents can be disregarded. Overall, measuring assemblies with lower overall dimensions can be achieved.

In a development of the invention of possibly independently inventive quality, provision can be made for the ionization device arranged in the ionization region of the ionization stage to be formed as a microsystem. It is advantageous that the ionization stage or preparation stage can also be miniaturized. In the ionization stage, ionization of the air takes place as corona charging; the ionization region can, for example, be formed in the manner of a chamber; in the relevant chamber, the particles led past the chamber or through the latter are charged, that is to say provided with a charge. An ionization device connected to a high voltage, generally amounting to some kV, can be provided as a wire implemented as a microsystem, as a grid or else as a flat application, for example in the form of a coating. This can also be, for example, a coated carrier diaphragm with which contact is made and which is arranged on the substrate. The ionization wire, which for example can preferably be a tungsten wire, can also be replaced by a UV LED as alternative ionization device, which means that optical ionization of the air can be achieved. In addition, such a diode can be integrated as a semiconductor component and thus formed as a microsystem. In an embodiment as a layer, this can be formed with a thickness of some tens of nanometers, for example 20 to 50 nm, noticeably thinner than a wire, the diameter of which is generally a few tens of micrometers. In this way, the voltage necessary for the ionization can possibly be reduced. Moreover, the high-voltage source and the control thereof can also be integrated into the substrate of the microsystem as a digital circuit or so-called mixed signal circuit. Equally, however, a supply from an external source is also conceivable.

In another advantageous development of the measuring assembly, the ionization device is formed with at least one ionization wire arranged in an ionization region, wherein the ionization wire is applied to a substrate and/or exposed, in particular wherein the ionization wire is laid or led over an ionization chamber formed in the substrate. Here, the wire is preferably exposed, which means that the ionization chamber or the ionization region is formed both above and below the wire, so that particles can be led past the wire on both "sides" in their flow path.

Since the fabrication of the preparation stage and the fabrication of the measuring and evaluation stage is carried out in operations of different complexity, in an expedient embodiment of the measuring assembly the ionization device, on the one hand, and the detector with one or more electrodes and possibly at least one evaluation electronics unit, on the other hand, are arranged on different substrates.

Provision can also be made for an ionization chamber, for example the aforementioned ionization chamber, to be formed by structurings of at least one substrate, in particular two substrates placed on one another. The structuring can be formed, for example, by chemical, physical and/or optical processing methods. It is advantageous here that the ionization device is fabricated completely or virtually completely as a microsystem, that is to say in microsystem technology.

The substrates can each be formed as parts of a wafer.

Here, in order to be able to preserve the compact unit of the measuring assembly and to space the functionalities no further from one another than necessary, a further embodiment of the measuring assembly provides the arrangement with a carrier part, which carries the substrates of the various stages together.

In developments which are advantageous, since they simplify the overall structure of the measuring assembly, firstly the gas flow path can be formed as a gas channel on the carrier part, secondly, however, it is also possible for the ionization region to be able to be delimited by the carrier part, in particular the carrier part can for example form a cover for the ionization region.

In an advantageous development, the carrier can be formed from silicon or a borosilicate glass material, in particular from Pyrex, so that the carrier part is simple to produce and handle.

BRIEF DESCRIPTION OF THE DRAWINGS

The invention will be explained in more detail below by using exemplary embodiments in the drawing. Here, in a partially highly schematic form.

DETAILED DESCRIPTION

Figure 1:
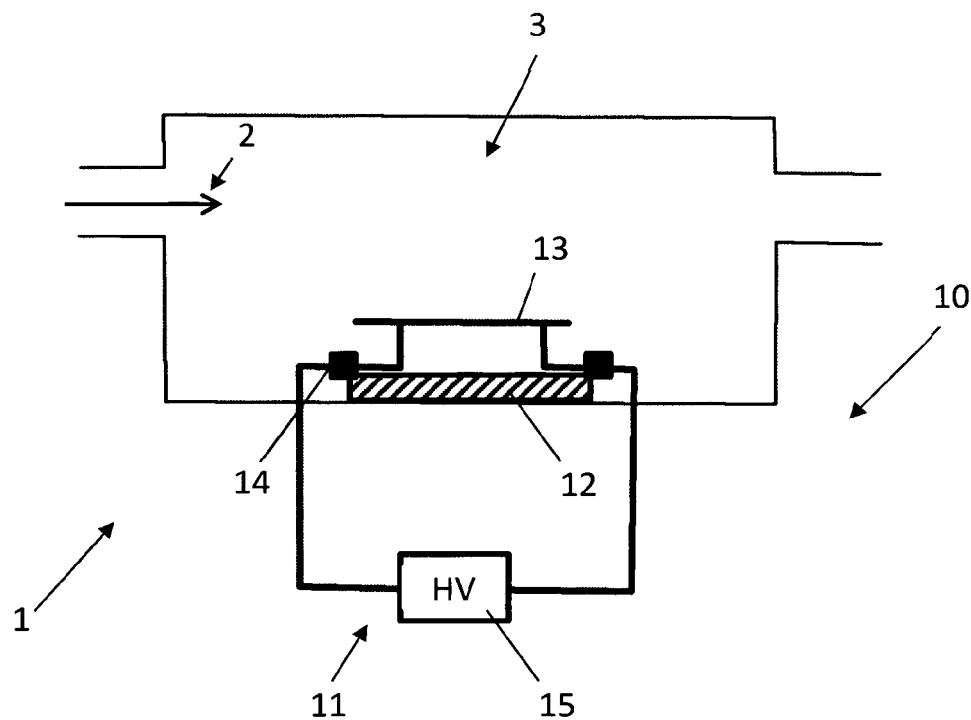
FIG. 1 shows a sectioned side view of a first exemplary embodiment of a measuring assembly according to the invention with its ionization stage, on which the electrode is arranged on a substrate and is connected to a high-voltage source.

FIGS. 1 to 6 each reveal a measuring assembly, designated overall by 1, for detecting particles of a particle stream 2, each indicated by arrows in its flow direction, in a gas flow path 3, comprising an ionization stage 10 which has an ionization device 11, by which the particles to be detected can be or are ionized. Furthermore, the measuring assembly 1 has a measuring stage 20 having a detector 21, which detects the ionized particles of the particle stream, wherein the detector 21 has at least one electrode 22, on which particles release the charge picked up on the ionization device 11, wherein the charge released can be measured via an electric resistor 23 connected to the electrode 22. The at least one electrode of the measuring assembly 1 is formed as a microsystem, that is to say in microsystem technology.

In this regard, from the measuring assembly 1, FIG. 1 reveals an ionization stage 10 with ionization device 11 arranged in an ionization chamber 16. Arranged within the ionization chamber 16, on a circuit board 12, is a tungsten wire 13, which is connected via contacts 14 to a high-voltage source 15. In the ionization chamber 12, ionization of the air, so-called corona charging, takes place on the tungsten wire 13, which means that the particles of the particle stream 2 are likewise ionized, charge is therefore released to the particles. In this way, the particle stream 2 leaves the ionization stage 10 in an ionized state.

Figure 2:
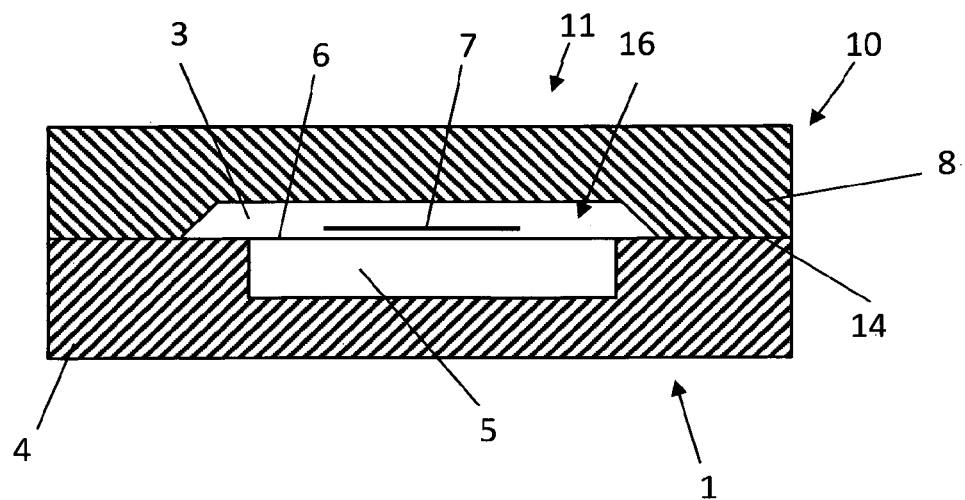
FIG. 2 shows a sectioned side view of a further exemplary embodiment of a measuring assembly according to the invention, in which the ionization stage is implemented with a higher level of integration.
Figure 3:
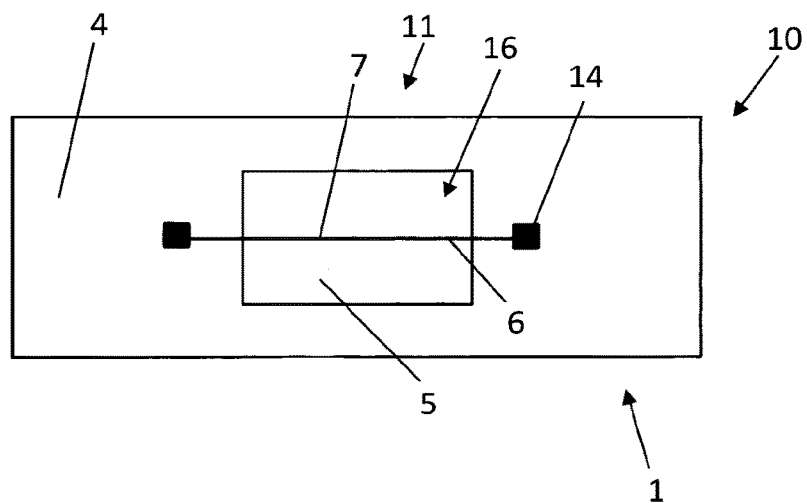
FIG. 3 shows a level plan view of the lower half of the ionization stage from FIG. 2.

With a higher level of integration, the same fact, specifically the passage of the particle stream 2 past an ionization stage, is illustrated in FIGS. 2 and 3. The movement of the particle stream takes place into the plane of the drawing of FIG. 2. There, the lower part of the illustration reveals a wafer made of a semiconductor material, specifically silicon, which, for insulation, is covered with a thin layer of silicon oxide or silicon nitride on its outer side, as a substrate 4, into which a depression 5 is introduced, for example via an etching process. The insulation makes it possible to apply electrically conductive structures without the latter being short-circuited by the silicon. The depression 5 is spanned by a web-like carrier diaphragm 6, which is provided with a metallic layer 7 of tungsten, which forms the ionizing part of the ionization device 11 and is connected to a high-voltage source, not specifically shown, via the electrical contacting connector 14. In the regions in which the web-like carrier diaphragm 6 engages over the substrate 4 itself, the two are insulated with respect to each other. The particle stream 2, not further illustrated, can flow around the carrier diaphragm 6 on all sides through the depression 5. Not shown in FIG. 3 and forming the upper part of the illustration in FIG. 2 is a type of cover 8 made of Pyrex material, the recess in which cover forms the gas flow path 3 for the particle stream 2. As compared with the tungsten wire 13 from FIG. 1, the tungsten layer 7 of FIGS. 2 and 3 arranged on the carrier diaphragm 6 is considerably thinner and can be supplied with a reduced voltage. Not illustrated is the fact that the circuitry of the high-voltage source 15 and its closed-loop control are integrated on the substrate 4.

Figure 4:
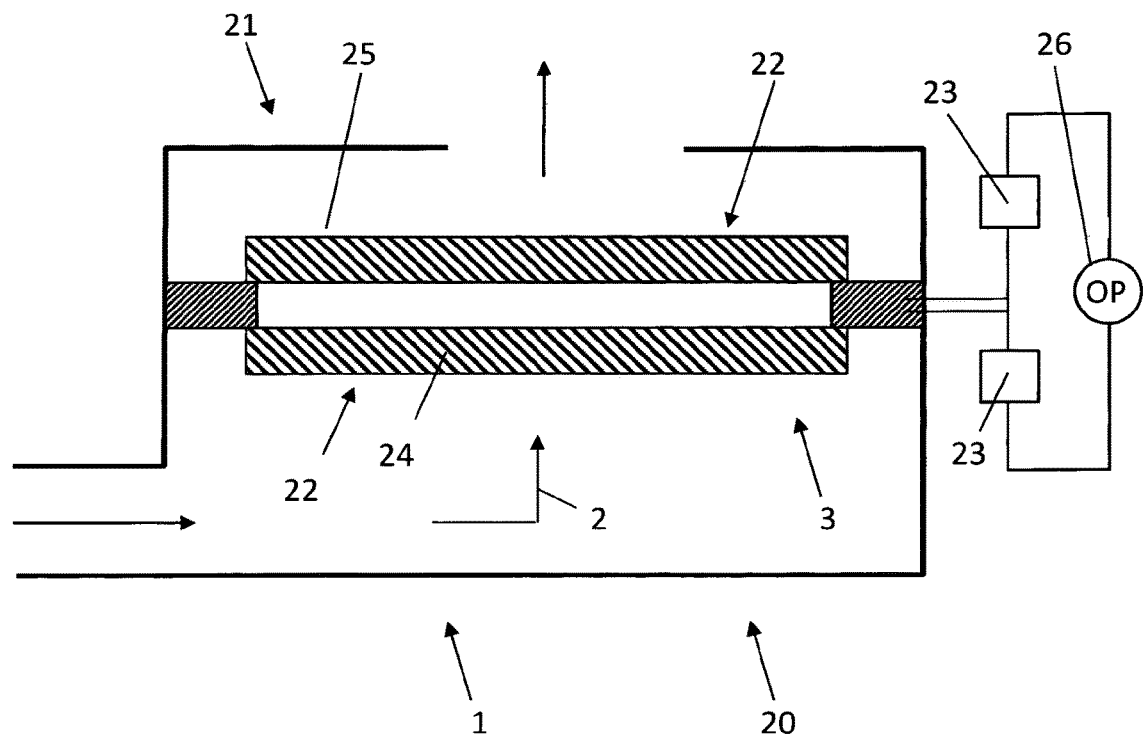
FIG. 4 shows a sectioned side view of a further exemplary embodiment of the measuring assembly, having a measuring stage with a detector which has a plurality of substrates of different pore size.
Figure 5:
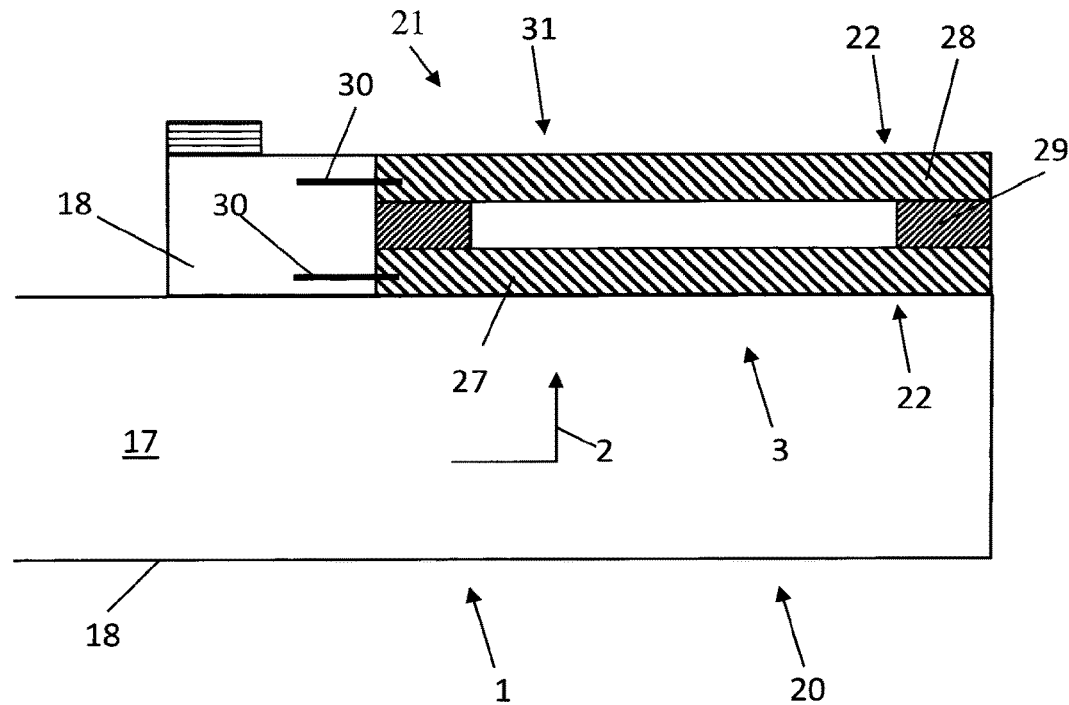
FIG. 5 shows a sectioned side view of a further exemplary embodiment of the measuring assembly, in which the measuring stage with detector is implemented in a higher level of integration.

In FIGS. 4 and 5, the measuring assembly 1 respectively illustrates formations of measuring stages 20 with different levels of integration, wherein, according to the invention, the electrodes 22 of the detector 21 of the measuring stage 20 are each formed as a microsystem. Coming from an ionization stage 10 not shown there, the particle stream 2 enters the measuring stage 20 respectively on its gas flow path 3, on the left-hand side of the measuring stage for the viewer. Changing the direction of movement, the particle stream then passes a multistage detector 21 of the measuring stage 20, which is formed with a plurality of electrodes 22, namely two, which are arranged one after another in the flow direction.

In FIG. 4, the electrodes are each formed as grids 24, 25 made of a metal and have a different mesh size, the more coarse-meshed of the two grids 24a being arranged upstream, that is to say forming the lower grid 24 for the viewer. Smaller particles are deposited on the latter, induced by the Brownian movement, while larger particles are "collected" and discharged on the upper grid 25, at the rear in the flow direction. Because of the release of the charges to the grids 24, 25, a current flow is respectively caused, which is measured via resistors 23 in the tera-ohm range. To indicate the relevant currents, these are amplified by an operational amplifier 26. In this way, the grids 24, 25 form with the lower, coarser-mesh grid 24, a type of diffusion stage, the upper finer-mesh grid 25 forms a type of filter stage, which collects the remaining residue of the charged particles.

In FIG. 5, this circumstance is illustrated with a measuring stage of increased integration. Here, too, a particle stream 2 is supplied to the measuring stage 20, wherein a channel 17 which is etched into a carrier substrate 18 made of a semiconductor material is used to supply the particles. In the further course of the particle stream 2 there is a detector 21 with two electrodes 22 arranged one after the other, which are passed successively by the particle stream 2, so that, in a way analogous to the formation as a grid, particles of different size can be filtered thereby. These electrodes 22 are formed by substrates, 27, 28 of different pore size, the pores of which have a tungsten coating 7 as the electrode material. Instead of tungsten, any conductive material, preferably a material that is usual in the semiconductor industry, which is not oxidized, can be used. The electrodes 22 are therefore formed as a microsystem. Here, once more the lower substrate 27 has a larger pore size than the upper substrate 28, so that, induced by the Brownian movement, the smaller particles are collected and discharged on the latter. The two substrates 27, 28 are separated by an insulating layer 29 of $Si_3N_4$. The resistors 30 used for the measurement are implanted in semiconductor material on the filter substrates 27, 28; in addition, without any detailed illustration, an operational amplifier and the voltage regulation are integrated on the carrier substrate 18.

Figure 6:
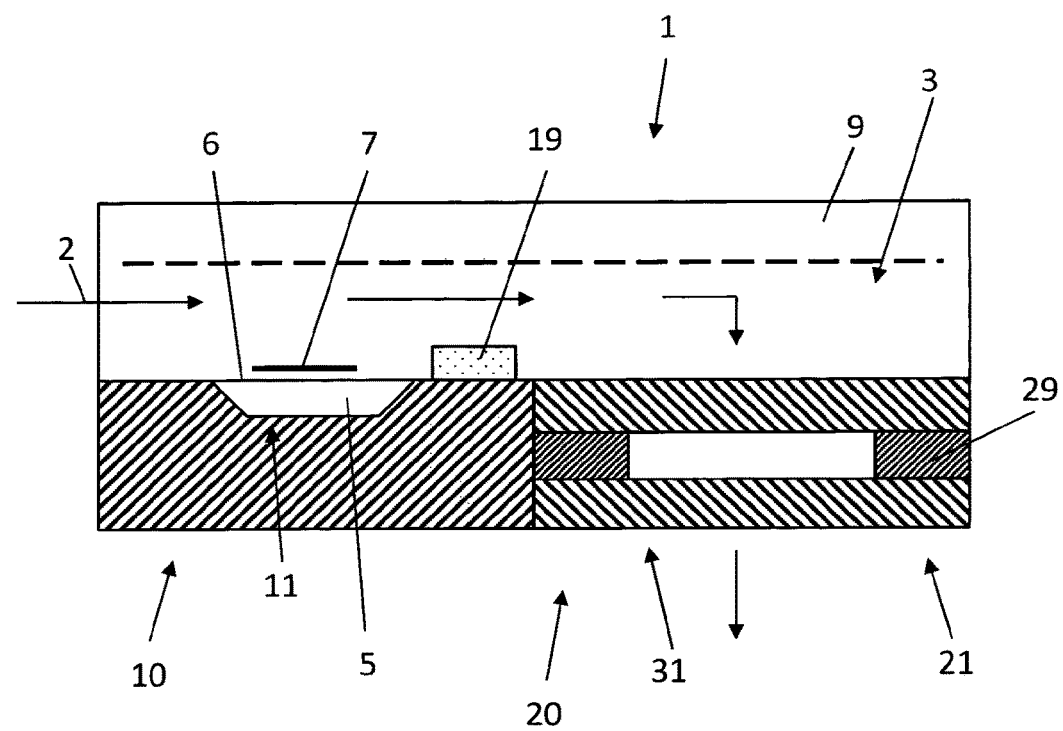
FIG. 6 shows a sectioned side view of the overall structure of a measuring assembly according to the invention with ionization stage and measuring stage.

FIG. 6 reveals a measuring assembly 1 in which both ionization stage 10 and measuring stage 20 are formed as a microsystem and are arranged jointly on the gas flow path 3 of the particle stream 2. The stages located beside each other in FIG. 6, the ionization stage 10 and the measuring stage 20, have a type of common side, which is covered by a cover 9 of semiconductor material, in which part of the gas flow path is located as channel 17. The particle stream 2, entering from the left for the viewer, is ionized in the ionization stage 10 on the ionization device 11. As in FIG. 2, a web-like carrier diaphragm 6 with a tungsten layer 7 spans a depression 5 in this ionization device 11. The tungsten layer 7 is connected to a high-voltage source formed in an integrated manner but not illustrated in detail. Following their charging, the then charged particles pass by the measuring stage 20, on which they are discharged. This is formed in two stages, as in FIG. 5, but in this case the substrate 27 to be passed first and having the larger pores is arranged "at the top" for the viewer. After passing the second filter substrate 28, the discharged particles of the particle stream 2 leave the measuring assembly 1. A supply and control part 19, which can be seen on the carrier substrate 4 of the ionization stage 10, symbolizes the integration of a high-voltage supply 15, of the operational amplifier 26, of the resistors 30 and further control elements needed on the measuring assembly 1, for example also an evaluation electronic unit.

In FIG. 5 and FIG. 6, it can be seen that the measuring stage 20 and in particular the detector 21 are formed in a measuring chamber 31, which itself is manufactured as a microsystem. For this purpose, the substrates 27, 28 can be correspondingly structured and/or connected to a structured insulation layer 29.

In this way, in FIG. 6, the overall structure of a measuring assembly 1 is shown, in which both the ionization stage 10 responsible for charging the particle stream 2 and the measuring stage 20 provided for the detection/measurement are provided as a micro-electromechanical system, that is to say form a microsystem, each on their own but also as a unit.

In FIGS. 2 and 3, it can be seen that the tungsten layer 7 is formed in an ionization chamber 16 of the ionization device 11, wherein the ionization chamber 16 is formed as a microsystem by structuring the carrier substrate 4, on the one hand, and the carrier part 8, likewise consisting of substrate material, on the other hand.

Accordingly, the present invention therefore relates to a measuring assembly 1 for detecting particles of a particle stream 2 in a gas flow path 3, comprising an ionization stage 10 which has an ionization device 11, by which the particles to be detected can be or are ionized. The measuring assembly 1 additionally has a measuring stage 20 with a detector 21, which detects the ionized particles of the particle stream 2, wherein the detector 21 has at least one electrode 22, on which particles release the charge picked up on the ionization device 11, wherein the released charge can be measured via an electric resistor 23, 30 connected to the at least one electrode 22. In order to have a beneficial and less fault-susceptible, reliable measuring assembly 1 available, it is proposed to form the at least one electrode of the detector as a microsystem, so that, with reduced costs, a miniaturized measuring assembly 1 system is available which has a lower power consumption and, as a result of a lower loading of the particle stream with particles, possibly causes lower contamination.

LIST OF REFERENCE NUMBERS

1 Measuring assembly
2 Particle stream
3 Gas flow path
4 Carrier substrate
5 Depression
6 Web-like carrier diaphragm
7 Tungsten layer
8 Carrier part
9 Carrier part
10 Ionization stage
11 Ionization device
12 Circuit board
13 Ionization wire
14 Electric contacting means
15 High-voltage source
16 Ionization chamber
17 Channel
18 Carrier substrate
19 Supply and control part
20 Measuring stage
21 Detector
22 Electrode
23 Resistor
24 Grid
25 Grid
26 Operational amplifier
27 Filter substrate
28 Filter substrate
29 Insulating layer
30 Resistor
31 Measuring chamber

The invention claimed is:

1. A measuring assembly for detecting particles of a particle stream (2) in a gas flow path (3), the measuring assembly comprising:
   an ionization stage (10) which has an ionization device (11), by which the particles to be detected are ionized;
   a measuring stage (20) with a detector (21) which detects the ionized particles of the particle stream (2), said detector (21) having at least one electrode (22) to which particles release a charge picked up from the ionization device (11
   an electric resistor (23, 30) connected to the at least one electrode (22) configured to measure the charges that are released by the particles; and
   the detector (21) has at least two of the electrodes (22) arranged in the gas flow path (3) and is formed with filter substrates (27, 28) having pores of different pore size, which are assigned to different ones of the filter substrates (27, 28), and the electrodes (22) are arranged beside one another in the gas flow path (3).

2. The measuring assembly as claimed in claim 1, wherein the electric resistor (23, 30) is formed as a microsystem.

3. The measuring assembly as claimed in claim 1, wherein the at least two of the electrodes (22) are provided as an electrically conductive coating (7) of a wall structure, which is arranged in the gas flow path (3) and through which the particle stream (2) is adapted to flow.

4. The measuring assembly as claimed in claim 3, wherein the wall structure is formed by a porous filter substrate (27, 28).

5. The measuring assembly as claimed in claim 1, further comprising a porous filter substrate that forms the at least one electrode, and pores of the filter substrate (27, 28) are metalized and connected electrically to the resistor (23, 30).

6. The measuring assembly as claimed in claim 1, wherein the electrodes (22) are located in respective ones of the filter substrates (27, 28) that are arranged adjacently one after another or beside one another in the gas flow path (3) and brought into contact with one another or spaced apart by an insulating layer (29).

7. The measuring assembly as claimed in claim 6, wherein the electrodes (22) are arranged one after another, and the electrode (22) having the filter substrate (27) of larger pore size is located upstream of the other electrode (22).

8. The measuring assembly as claimed in claim 1, wherein each said electrode (22) of the detector (21) is assigned an evaluation electronics unit which, together with the electrode (22) is arranged on a carrier substrate (4).

9. The measuring assembly as claimed in claim 1, wherein the ionization device (11) is formed as a microsystem.

10. The measuring assembly as claimed in claim 1, wherein the ionization device (11) is formed with at least one ionization wire (13) arranged in an ionization region, the ionization wire (13) is at least one of applied to a carrier substrate (4) or is exposed.

11. The measuring assembly as claimed in claim 1, wherein the ionization device (11) and the detector (21) with the at least one electrode (22) and at least one evaluation electronics unit are arranged on different substrates (4, 27, 28).

12. The measuring assembly as claimed in claim 1, further comprising a carrier part (9) which carries substrates (4, 27, 28) of the different stages (10, 20) together.

13. The measuring assembly as claimed in claim 1, wherein the gas flow path (3) is formed as a gas channel on a carrier part (8, 9) assigned to at least one of the ionization stage or the measuring stage.

14. The measuring assembly as claimed in claim 13, wherein the ionization region (11) is delimited by the associated carrier part (8), which forms a cover for the ionization region (11).

15. The measuring assembly as claimed in claim 13, wherein the carrier part (8, 9) is formed from silicon or a borosilicate glass material.

16. The measuring assembly as claimed in claim 1, wherein the detector (21) of the measuring stage (20) is formed in a measuring chamber (31).

17. The measuring assembly as claimed in claim 16, wherein the measuring chamber (31) formed as a microsystem or formed by structuring at least one substrate (4, 27, 28).

* * * * *